United States Patent
Cayla et al.

(10) Patent No.: US 7,283,501 B2
(45) Date of Patent: Oct. 16, 2007

(54) METHOD FOR SENDING MODULATED-SIGNAL BLOCKS, SENDING STATION AND DATA SOURCE FOR THE IMPLEMENTATION OF THE METHOD

(75) Inventors: Stéphane Cayla, Viroflay (FR); Suat Eskicioglu, Paris (FR)

(73) Assignee: Nortel Networks Limited, St. Laurent, Ouebec (CA)

(*) Notice: Subject to any disclaimer, the term of this patent is extended or adjusted under 35 U.S.C. 154(b) by 1155 days.

(21) Appl. No.: 10/187,934

(22) Filed: Jul. 2, 2002

(65) Prior Publication Data
US 2003/0012161 A1 Jan. 16, 2003

(30) Foreign Application Priority Data
Jul. 2, 2001 (FR) .................................. 01 08754

(51) Int. Cl.
*H04J 3/00* (2006.01)
*H04B 7/212* (2006.01)
(52) U.S. Cl. ..................... 370/336; 370/347; 370/442
(58) Field of Classification Search .................. None
See application file for complete search history.

(56) References Cited

U.S. PATENT DOCUMENTS
5,859,840 A 1/1999 Tiedemann
6,005,855 A 12/1999 Zehavi

OTHER PUBLICATIONS

ETSI TS 101 350—V8.5.0—Global System for Mobile Communications (Aug. 2000).
ETSI EN 300 909—V8.5.1—Global System for Mobile Communications (Nov. 2000).

*Primary Examiner*—Steven Nguyen
(74) *Attorney, Agent, or Firm*—Trop, Pruner & Hu, P.C.

(57) ABSTRACT

The modulated-signal blocks are formed by a sending station from respective data blocks of variable size received from a data source on a time-division multiplexing synchronous link. They are then sent with a specified block rate on multiplexed physical channels. The synchronous link between the data source and the sending station supports dedicated channels respectively associated with the physical channels, each offering a specified transmission capacity determined over a sending period inverse to the block rate, and supplementary channels. A part at least of each data block intended for a physical channel is transmitted on the associated dedicated channel. When the size of the block exceeds the transmission capacity, another part is transmitted on at least one supplementary channel of the synchronous link, allocated dynamically to the physical channel.

12 Claims, 2 Drawing Sheets

METHOD FOR SENDING MODULATED-SIGNAL BLOCKS, SENDING STATION AND DATA SOURCE FOR THE IMPLEMENTATION OF THE METHOD

BACKGROUND OF THE INVENTION

The present invention relates to techniques for transmitting data blocks of variable size on synchronous links, these data blocks serving to form modulated-signal blocks which are then sent on multiplexed physical channels.

It has applications in particular in systems for radio communication with mobiles which can operate in packet mode, such as GPRS ("General Packet Radio Service") networks.

On multiplexed physical channels, the modulated-signal blocks are often sent according to a frame structure defining successive periods for sending blocks on each channel. For example, the periodicity of the GPRS radio blocks is 20 ms.

The modulated-signal blocks can form the subject of variable protection against transmission errors. This can be achieved by adjusting the rate of the channel coder generally provided in the transmission chain, either by selecting the code applied from among several block codes or convolutional codes, or by setting a degree of puncturing of the code. Another possibility is to vary the level of protection by choosing a more or less robust modulation: for a given symbol duration within the modulated signal, a binary modulation, for example, will provide greater protection than a quaternary or 8-ary modulation.

Owing to the variable protection against transmission errors, the modulated-signal blocks are formed from data blocks of variable size. In certain systems, the construction of these data blocks of variable size and their transformation into modulated-signal blocks by coding and modulation are not performed at the same spot, so that these blocks of variable size must be transmitted from their source to the coder.

In the example of downlinks in GPRS networks, the data source which constructs the variable-size blocks is called the PCU ("Packet Control Unit"), and the coder and the modulator are situated in the transceiver base stations or BTS. In the frequent case where the PCU is remote from the BTS, the uncoded blocks are transmitted on a time-division multiplexing synchronous link. These links rely on a standardized technique of pulse code modulation (PCM). Each physical channel on the radio interface is associated with a dedicated channel on the synchronous link, this channel consisting of a 16-kbit/s PCM subpath. A PCM path, called DS0, ensures a throughput of 64 kbit/s, at the rate of one byte every 125 μs. The PCM circuits support up to 32 DS0 paths in the case of a type E1 synchronous interface (2.048 Mbit/s) or up to 24 DS0 paths in the case of a type T1 synchronous interface (1.544 Mbit/s).

A problem posed by systems of this type is that the capacity of a dedicated channel of the synchronous link over a block sending period may be insufficient with regard to the blocks having the largest sizes, that is to say those which contain the least-protected data. A fixed allocation of several channels of the synchronous link to each physical channel is possible, but it leads to an expensive overrating of the transmission capacity.

An aim of the present invention is to propose a mode of transmission of data blocks of variable size which avoids the above problem while limiting the complexity and the cost of the equipment.

SUMMARY OF THE INVENTION

The invention proposes a method for sending modulated-signal blocks on multiplexed physical channels, wherein the modulated-signal blocks are formed by a sending station from respective data blocks of variable size received from a data source on a time division multiplexing synchronous link, and are sent with a specified block rate on each physical channel. The synchronous link between the data source and the sending station supports dedicated channels respectively associated with the said physical channels, each offering a specified transmission capacity over a sending period inverse to the block rate, and supplementary channels. A part at least of each data block from which is formed a modulated-signal block sent on a physical channel is transmitted from the data source to the sending station on the dedicated channel associated with the said physical channel, and when the size of the said data block exceeds the said transmission capacity, another part of the said data block is transmitted on at least one supplementary channel of the synchronous link, allocated dynamically to the said physical channel.

A statistical multiplexing of the excess traffic with respect to the capacity of the dedicated channels is thus achieved in such a way that the operator can define the rating of the synchronous links as a function of estimates of the mean traffic, and not as a function of the maximum throughput liable to pass through each physical channel.

Another aspect of the invention pertains to a data source for the implementation of the method, comprising:
  means for constructing data blocks of variable size with a view to the sending of respective modulated-signal blocks on multiplexed physical channels by a remote sending station, the modulated-signal blocks being sent with a specified block rate on each physical channel;
  means for transmitting of the data blocks to the sending station over a synchronous link supporting dedicated channels respectively associated with the said physical channels, each offering a specified transmission capacity over a sending period inverse to the block rate, and supplementary channels;
  means for dynamically allocating at least one supplementary channel of the synchronous link to each physical channel for which a data block of size greater than the said transmission capacity has been constructed; and
  means for segmenting the data blocks so as to divide each data block, constructed with a view to the sending of a modulated-signal block on a physical channel and having a size greater than the said transmission capacity, into a part transmitted on the dedicated channel associated with the said physical channel, and at least one other part transmitted on a supplementary channel of the synchronous link, respectively allocated dynamically to the said physical channel.

A third aspect of the invention pertains to a sending station for the implementation of the method, comprising:
  means for forming modulated-signal blocks from respective data blocks of variable size;
  means for sending the modulated-signal blocks on multiplexed physical channels, with a specified block rate on each physical channel; and
  means for receiving the data blocks originating from a data source by a synchronous link supporting dedicated channels respectively associated with the said physical channels, each offering a specified transmission capacity over a sending period inverse to the block rate, and supplementary channels.

The means for receiving the data blocks comprise means for determining a dynamic allocation of supplementary channels of the synchronous link to at least one of the multiplexed physical channels during a sending period, and for assembling each data block having a size greater than the said transmission capacity, with a block part received on dedicated channel associated with a physical channel and at least one other block part received on a respective supplementary channel of the synchronous link, which channel is allocated dynamically to the said physical channel.

DESCRIPTION OF PREFERRED EMBODIMENTS

The invention is described hereinbelow in its application to GPRS networks. These networks have been developed to allow the transmission of data in packet mode in cellular networks of the GSM type (standing for "Global System for Mobile Communications"). More particular consideration will be given to the transmission of packets in the downlink direction, that is to say from the infrastructure of the network to the mobile stations.

Figure 1:
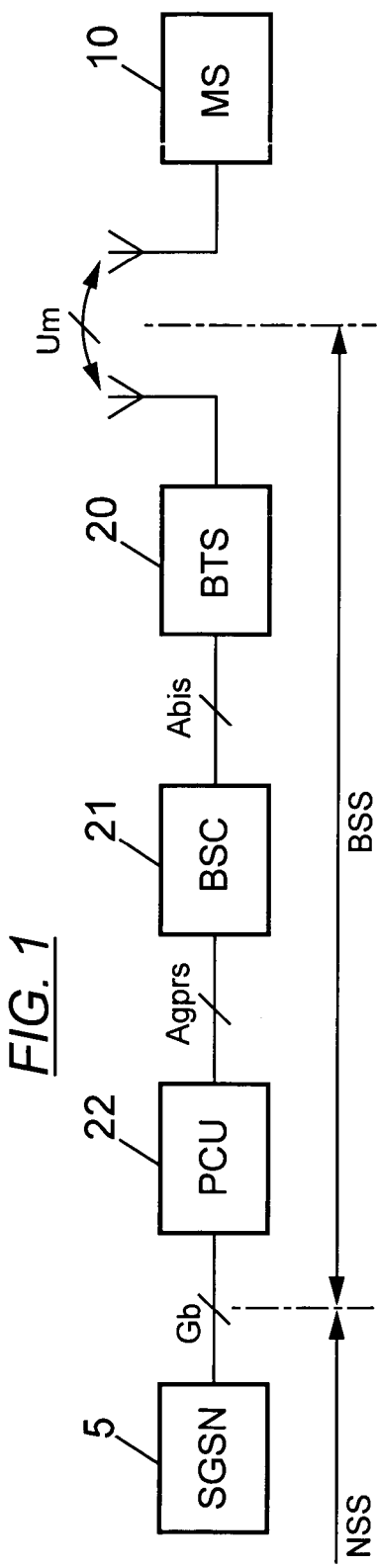
FIG. 1 is a diagram of a GPRS type network to which the invention can be applied.

The GPRS network illustrated in FIG. 1 is built on a GSM infrastructure, and conventionally divided into a network core, also called Network and Switching Subsystem or NSS, and a radio-access network also called Base Station Subsystem or BSS.

For the packet service, the switches of the NSS are called GPRS support nodes or GSNs. A distinction is made between the SGSNs (Serving GSNs) 5 which are linked to the BSS by way of an interface called Gb, and the GGSNs (Gateway GSNs, not represented) which serve as a gateway with external packet transmission networks, such as the Internet, for example.

A general description of the radio interface, called Um, between the mobile stations (MS) 10 and the base stations (BTS) 20 of the BSS is provided in the technical specification ETSI TS 101 350, "Digital cellular telecommunications system (Phase 2+); General Packet Radio Service (GPRS); Overall description of the GPRS radio interface; Stage 2 (GSM 03.64, version 8.5.0, Release 1999)", published by ETSI (European Telecommunications Standards Institute) in August 2000.

Each base station 20 is supervised by a base station controller or BSC 21 by way of an interface called Abis. In order to manage the transmission of GPRS packets, the BSS further comprises a packet control unit or PCU 22. The locating of the PCU within the BSS is not standardized. The invention is generally applicable whenever the data source consisting of the PCU is remote from the sending stations consisting of the BTSs. In the example represented in FIG. 1, the PCU 22 is situated between the BSC 21, with which it communicates via an interface called Agprs, and the NSS, with which it communicates via the interface Gb.

Figure 2:
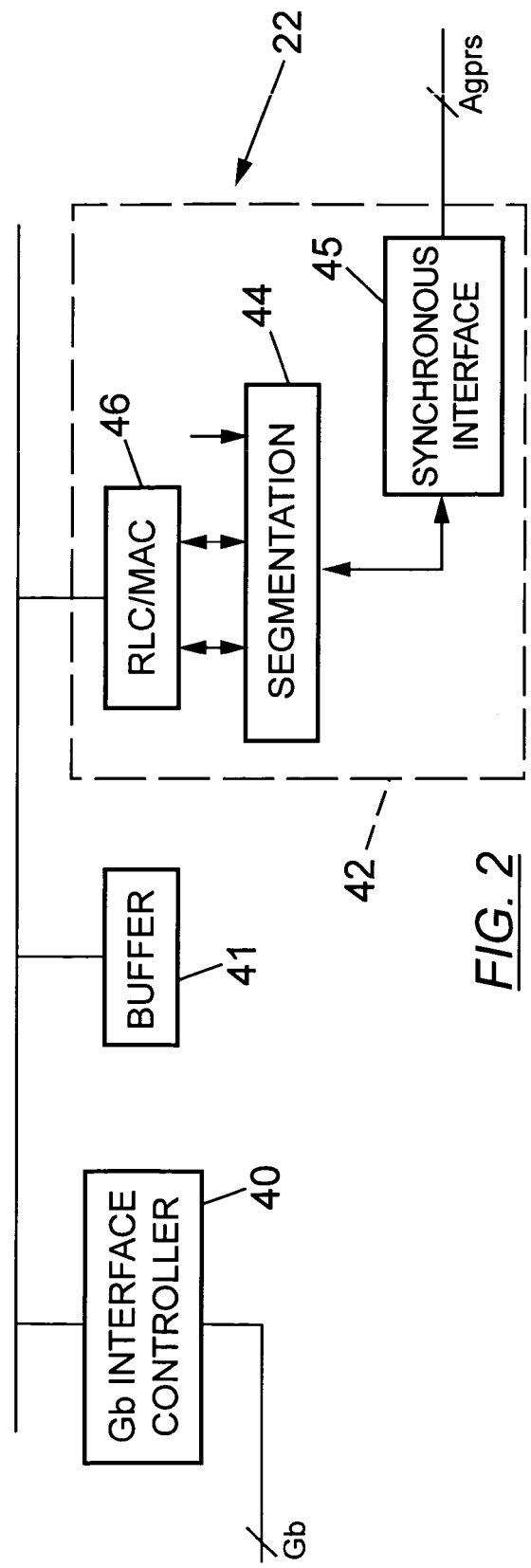
FIG. 2 is a schematic diagram of a packet control unit of such a network, tailored to the implementation of the invention.

FIG. 2 illustrates a possible structure of a PCU 22 situated between an SGSN 5 and a BSC 21, as in the example of FIG. 1. The reference 40 designates the Gb interface controller for the link with the SGSN 5.

The Gb interface is of asynchronous type. It is based on the frame relay (FR) protocol, as well as on a protocol called BSSGP (BSS GPRS Protocol) which transports routing and quality-of-service information between the BSS and the SGSN. The Gb interface controller 40 provides the physical link with the SGSN 5, as well as carrying out the procedures specific to the FR and BSSGP protocols.

The links between the PCU 22 and the BTSs 20 via the Agprs interface are of synchronous type. Consequently, the data manipulated by the PCU 22 between the Gb interface controller 40 and the Agprs interface controller 42 transit via a buffer memory 41 where packet queues are recorded.

Between the PCU 22 and the BTS 20, the information is carried by 320-bit frames of TRAU (Transcoder/Rate Adapter Unit) type. These TRAU frames are formatted and processed by a module 44 and transmitted by way of synchronous interface circuits 45 which form 16-kbit/s PCM subpaths with the BTSs 20. In GSM systems, the 64-kbit/s paths (DS0) are customarily subdivided into four subpaths each dedicated to a physical channel on the radio. Several 16-kbit/s channels (subpaths) are time multiplexed on the Agprs interface and switched by the BSC 21 for routing to the BTSs.

A module 46 of the Agprs interface controller 42 implements the radio protocols of layer 2 of the OSI model, that is to say the RLC/MAC (Radio Link Control/Medium Access Control) protocols described in the European Standard ETSI EN 301 349, "Digital cellular telecommunications system (Phase 2+); General Packet Radio Service (GPRS); Mobile Station (MS)—Base Station System (BSS) interface; Radio Link Control/Medium Access Control (RLC/MAC) protocol (GSM 04.60, version 8.3.1, Release 1999)", published by ETSI in October 2000.

The RLC sublayer forms the interface with the upper-layer protocol, called LLC (Logical Link Control). It carries out the segmentation and the reassembling of LLC protocol data units (LLC-PDUs), which are exchanged asynchronously on the Gb interface. It produces RLC data blocks to which the MAC sublayer adds a one-byte MAC header.

In the downlink direction, from the PCU to the MSs, the MAC header of each RLC/MAC block includes:
- a three-bit USF (Uplink State Flag) field, serving to indicate which mobile station is authorized to use an uplink resource corresponding to the downlink resource on which the RLC/MAC block is transmitted;
- a three-bit acknowledgement control field, including a one-bit S/P (Supplementary/Polling) subfield indicating whether the acknowledgement-control field is active (S/P=1) or inactive (S/P=0) and a two-bit RRBP (Relative Reserved Block Period) subfield uniquely specifying an uplink block in which the mobile station addressed should transmit an acknowledgement message;
- a two-bit Payload Type field, specifying the type of RLC block following (data, control, etc).

It is the transmission of RLC data blocks which is of interest here. Each of these blocks includes an RLC header following the MAC header byte. This RLC header especially includes the following information:
- temporary flow identity (TFI), consisting of five bits identifying the temporary block flow (TBF), from which the RLC data of the block originate. A TBF is a connection supporting the unidirectional LLC-PDU transfer on physical data channels. A TBF is temporary, that is to say that it is maintained only during the data transfer;

a block sequence number BSN of SNS bits, which contains the sequence number of the RLC/MAC block in the TBF, modulo $2^{SNS}$, SNS being a predefined number.

The MAC sublayer furthermore manages the multiplexing of the blocks arising from the various TBFs which are active on the available physical channels, arbitrating among the various mobile users via a planning mechanism ("scheduling").

In the case of the GPRS, a variable level of protection against transmission errors on the radio can be selected block by block within a TBF, by the choice of a coding scheme (CS) from among four schemes CS-1 to CS-4 specified in the European Standard ETSI EN 300 909, Digital cellular telecommunications system (Phase 2+); Channel coding (GSM 05.03, version 8.5.1, Release 1999), published by ETSI in November 2000.

The scheme CS-4 does not use any error-correction coding, that is to say that the coding rate is equal to 1: only a block-check sequence BCS is adjoined to the data blocks. The schemes CS-1 to CS-3 use a convolutional code with rate ½ after the addition of the BCS sequence. No puncturing is carried out in the CS-1 scheme (which offers the highest level of protection), while puncturing is applied in the CS-2 and CS-3 schemes so that they give rise to overall coding rates of about ⅔ and of about ¾, respectively.

The CS-i ($1 \leq i \leq 4$) channel coding is applied at the level of the physical-layer protocol, that is to say in the BTSs in the case of the downlinks. Each BTS comprises at least one transceiver unit (TRX) processing eight multiplexed physical channels. The multiplexing of these eight physical channels is of the TDMA time sharing type ("Time-Division Multiple Access"), with successive frames of 4.615 ms each broken down into eight time slots. A physical channel corresponds to time slots of corresponding rank in the frame structure. The frequency of sending on such a channel can be fixed, or variable from one frame to another if a frequency hopping method is applied. Each RLC/MAC block gives rise to a radio block which, after the channel coding in a TRX unit, is composed of 456 bits transmitted in corresponding time slots of four consecutive TDMA frames. The 114 bits of coded information of each time slot are modulated so as to be transmitted on the radio interface according to a two-state phase shift modulation of GMSK type ("Gaussian Minimum Shift Keying").

For a physical data channel (PDCH), a multiframe lasts 240 ms and is composed of 52 TDMA frames, four of which are inactive or serve for the transmission of control information. There are thus twelve radio blocks per multiframe, i.e. one radio block every 20 ms.

A pattern of eight signalling bits SB is inserted into each radio frame (two bits per time slot) so as especially to indicate which coding scheme has been applied by the transmitter.

These signalling bits are extracted from the coded block received by the addressee, in order to allow it to identify the coding scheme. The receiver then carries out the appropriate decoding of the block which will give rise to a positive acknowledgement if it is successful and if the decoded BCS is consistent with the content of the block.

The coding scheme applied to the downlink is determined in a way which is known in itself by the PCU on the basis of measurements of reception quality on the radio link, according to link-adaptation mechanisms which seek to achieve an objective in terms of rate of error-affected blocks so as to optimize the raw throughput. The scheme selected is inserted into the TRAU frame carrying the block so as to be applied by the BTS.

Table I indicates the data throughputs offered by the CS-1 to CS-4 coding schemes of a GPRS system. It may be seen that a 16-kbit/s PCM subpath is sufficient to convey from the PCU to the BTS the information relating to a time slot of the TDMA frame of a TRX unit when the scheme applied is CS-1 or CS-2, but that another subpath becomes necessary to convey the user data, in addition to the various control information needed by the TRX unit (and which is not included in the throughput calculation of Table I), when the scheme applied is CS-3 or CS-4.

TABLE I

| Scheme | Modulation | Throughput (kbit/s) | Number of PCM subpaths required |
| --- | --- | --- | --- |
| CS-1 | GMSK | 9.05 | 1 |
| CS-2 | GMSK | 13.4 | 1 |
| CS-3 | GMSK | 15.6 | 2 |
| CS-4 | GMSK | 21.4 | 2 |

The above-mentioned standards from ETSI also specify an extension of the GPRS system, using EDGE (Enhanced Data for GSM Evolution) modulation. This extension is called EGPRS (EDGE-GPRS). It uses, in addition to GMSK, an eight-state phase shift modulation (8-PSK, "8-state Phase Shift Keying"), with the same TDMA frame structure and the same symbol duration as in the GPRS case. As the symbols are 8-ary instead of binary, the raw throughput can be up to three times as large.

In an EGPRS system, the RLC/MAC layer uses SNS=11, and the RLC and MAC headers are grouped together into a single RLC/MAC header which no longer has the "Payload Type" field and in which the S/P bit is replaced by a two-bit ES/P subfield making it possible to specify different acknowledgement formats in the case of polling (ES/P≠00). Nine modulation and coding schemes, called MCS-1 to MCS-9, are provided. The scheme used for a given block, as well as any puncturing scheme being applied, are indicated in a CPS (Coding and Puncturing Scheme indicator) field of the EGPRS RLC/MAC header.

The whole of the EGPRS RLC/MAC header is the subject of channel coding separate from that of the data of the block. The level of protection of this header against transmission errors is higher than that of the data, in order to ensure greater robustness of the signalling information.

Table II indicates the data throughputs required on the Abis interface by the MCS-1 to MCS-9 coding schemes of an EGPRS system for each downlink physical channel. A 16-kbit/s PCM subpath is sufficient only for the MCS-1 and MCS-2 schemes. Up to five subpaths may be necessary in MCS-8 or MCS-9.

TABLE II

| Scheme | Modulation | Throughput (kbit/s) | Number of PCM subpaths required | Proportion of use |
| --- | --- | --- | --- | --- |
| MCS-1 | GMSK | 10.45 | 1 | 20% |
| MCS-2 | GMSK | 12.85 | 1 | 20% |
| MCS-3 | GMSK | 16.45 | 2 | 0% |
| MCS-4 | GMSK | 19.25 | 2 | 0% |
| MCS-5 | 8-PSK | 24.35 | 2 | 30% |
| MCS-6 | 8-PSK | 31.55 | 3 | 12% |

TABLE II-continued

| Scheme | Modulation | Throughput (kbit/s) | Number of PCM subpaths required | Proportion of use |
|---|---|---|---|---|
| MCS-7 | 8-PSK | 47.3 | 4 | 10% |
| MCS-8 | 8-PSK | 56.9 | 5 | 2% |
| MCS-9 | 8-PSK | 61.7 | 5 | 6% |

It should be noted that in MCS-7, MCS-8 and MCS-9, two RLC/MAC blocks are transposed on a 20-ms radio block. Thus, the "data block" from which a radio block can be formed and which must be transmittable from the PCU to the BTS at a rate of one block every 20 ms per physical channel, can comprise several RLC/MAC blocks. It also comprises various items of control information useful to the BTS for the formation of the radio block, in particular the designation of the coding scheme and/or modulation scheme to be applied.

On the synchronous link between the PCU 22 and each TRX unit of a BTS 20, there are provided eight dedicated channels consisting of 16-kbit/s PCM subpaths. These dedicated 16-kbit/s channels are associated in a fixed manner with the eight time slots of the downlink TDMA frame of the TRX unit.

The transmission capacity of 320 bits every 20 ms per dedicated channel associated with a physical channel is sufficient in the CS-1, CS-2, MCS-1 and MCS-2 schemes. However, for the other schemes it is necessary to allocate supplementary transmission resources on the synchronous link. To do this, one or more other DS0 paths are provided for each TRX unit of the BTS 20 at the level of the synchronous interface circuit 45 of the PCU 22. Each DS0 path thus added affords four supplementary 16-kbit/s PCM subpaths or channels which can be switched by the BSCs 21 so as to be routed to the appropriate BTSs.

If N designates the number of DS0 paths thus added to the two DS0 paths carrying the eight dedicated channels on the synchronous link between the PCU 22 and a TRX unit, then there are 4.N supplementary 16-kbit/s channels which can be allocated dynamically to the physical channels processed by this TRX unit. The number N is chosen as a function of the GPRS traffic expected in the cell served by the BTS, this allowing optimal rating of the PCM links.

By way of example, for a typical configuration of services in an urban cell served by a BTS 20 of an EGPRS system, it can be estimated that the proportions of application of the MCS-1 to MCS-9 schemes to the users are as indicated in the last column of Table II. If this BTS comprises a single TRX unit for the EGPRS packet mode, the mean number of PCM subpaths required for this TRX unit is around 17.3 according to the last two columns of Table II. A total of 5 DS0 paths is then envisaged for the TRX unit concerned at the level of the interface circuit 45 of the PCU. The statistical multiplexing of the users allows this total to be sufficient whereas an entirely fixed allocation of PCM subpaths would require eight DS0 paths.

With reference to FIG. 2, every 20 ms the MAC module 46 supplies data to be transmitted respectively in k radio blocks on the k active TDMA channels of the TRX unit considered ($k \leq 8$). The segmentation module 44 inserts these data into 320-bit TRAU frames at a rate of M frames per 20-ms sending period for each active TDMA channel, the number M being variable from one physical channel to another and over time as a function of the coding scheme and/or modulation scheme applied, with $1 \leq M \leq 5$ (cf. Tables I and II).

When M=1 for a specified TDMA channel, the TRAU frame is simply inserted into the corresponding dedicated PCM subpath on the synchronous interface between the PCU and the BTS.

To each TDMA channel for which M>1, the module 44 allocates M−1 of the supplementary 16-kbit/s PCM subpaths. The first of the M TRAU frames of the relevant sending period is transmitted on the dedicated PCM subpath associated with this TDMA channel, and the following M−1 frames are respectively transmitted on the M−1 supplementary PCM subpaths which have been allocated thereto. The segmentation module 44 inserts into each of these M−1 following TRAU frames information allowing the TRX unit to reconstruct the data block to be coded, namely:

the address, coded on 3 bits, of the time slot corresponding to the relevant channel in the TDMA frame, the TRAU frame being transmitted on the supplementary PCM subpath allocated dynamically to this TDMA channel;

a serial number of this TRAU frame in the data block transmitted for this time slot. The number M−1 of supplementary PCM subpaths allocated to a TDMA channel being limited to 4, this serial number can be coded on 2 bits.

Figure 3:
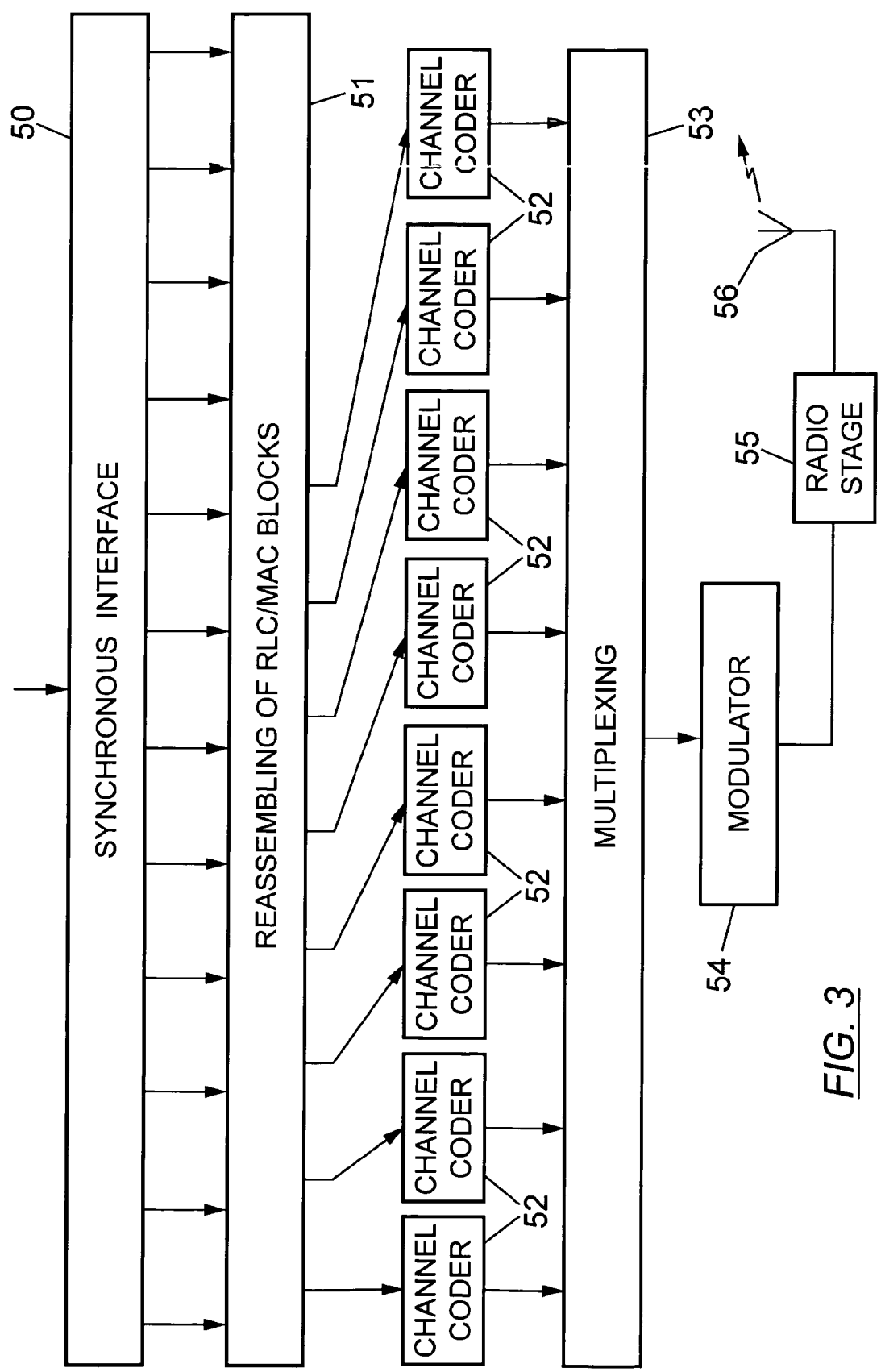
FIG. 3 is a schematic diagram of a transceiver unit of a base station in accordance with the invention and belonging to the network of FIG. 1.

With reference to FIG. 3, the TRX unit of the BTS 20 comprises a synchronous interface circuit 50 which receives the 16-kbit/s PCM subpaths formed by the PCU 22 and switched by the BSC 21, and demultiplexes these subpaths so as to restore the TRAU frames which they transport. These frames are supplied to a module 51 for reassembling the RLC/MAC blocks. The latter module extracts the information from the TRAU frames so as to reconstruct the RLC/MAC blocks destined for the various physical channels, thereby also allowing it to identify the coding scheme and/or modulation scheme which are to be applied to these RLC/MAC blocks.

When the data block relating to a physical channel over a period of 20 ms occupies M 16-kbit/s PCM subpaths with M>1, the corresponding RLC/MAC block is assembled from the data received on these M subpaths. The module 51 detects in the supplementary subpaths the addresses identifying the relevant TDMA channels, as well as the serial numbers of the TRAU frames in the block, thereby enabling it to reassemble the RLC/MAC blocks simply.

For each physical channel, the TRX unit comprises a channel coder 52 of variable rate. This coder 52 applies to each RLC/MAC block supplied by the reassembly module 51 an error-correcting code corresponding to the coding scheme and/or modulation scheme which the module 51 has also retrieved from the relevant TRAU frame or frames. The rate of the channel coder 52 is thus tailored to produce a radio block of fixed size corresponding to 456 symbols to be modulated.

A multiplexer 53 ensures the multiplexing of the data blocks coded in accordance with the TDMA frame and multiframe structure, and delivers the digital signal thus formed to the modulator 54. This modulator 54 forms the modulated radio signal blocks which are processed by the circuits of the radio stage 55 before being transmitted by the antenna 56 of the BTS.

In the case of a GPRS network, the modulator 54 is a straightforward GMSK modulator. In the EGPRS case, it applies either the GMSK modulation or the 8-PSK modulation in each time slot, as a function of the coding and modulation scheme indicated dynamically for the TDMA channel.

We claim:

1. A method for sending modulated-signal blocks on multiplexed physical channels, the method comprising:

forming the modulated-signal blocks by a sending station from respective data blocks of variable size received from a data source on a time-division multiplexing synchronous link, and sending the modulated-signal blocks with a specified block rate on each physical channel, wherein the synchronous link between the data source and the sending station supports dedicated channels respectively associated with the said physical channels, each offering a specified transmission capacity over a sending period inverse to the block rate, and supplementary channels;

transmitting a part at least of each data block from which is formed a modulated-signal block sent on a physical channel from the data source to the sending station on the dedicated channel associated with the said physical channel; and transmitting another part of the said data block, when the size of the said data block exceeds the said transmission capacity, on at least one supplementary channel of the synchronous link, allocated dynamically to the said physical channel, wherein, on each supplementary channel of the synchronous link allocated to a physical channel for a sending period, an address identifying the said physical channel is transmitted.

2. Method as claimed in claim 1, wherein the sending station applies to data to be coded extracted from each data block a channel coding whose rate is tailored to produce a modulated-signal block of fixed size.

3. Method as claimed in claim 1, comprising the following steps executed by the data source for each sending period:

constructing at least one data block with a view to the sending of a modulated-signal block on a respective physical channel;

for each data block constructed with a view to the sending of a modulated-signal block on a physical channel and having a size less than or equal to the said transmission capacity, transmitting the said data block on the dedicated channel associated with the said physical channel; and if at least one data block constructed with a view to the sending of a modulated-signal block on a physical channel has a size greater than the said transmission capacity, allocating the said physical channel at least one supplementary channel of the synchronous link, transmitting a part of the said data block on the dedicated channel associated with the said physical channel and another part on each supplementary channel respectively allocated to the said physical channel.

4. Method as claimed in claim 3, wherein the supplementary channels of the synchronous link offer the same capacity as the dedicated channels, and wherein, on each of the synchronous link's supplementary channels allocated to a physical channel for a sending period, there is furthermore transmitted a serial number of the block part transmitted on the said supplementary channel within data block constructed with a view to the sending of the modulated-signal block on the said physical channel.

5. Method as claimed in claim 3, wherein each data block comprises data to be coded and control information including an indication of a coding scheme and/or modulation scheme, and wherein the sending station executes the following steps for each sending period:

determining the allocation of the supplementary channels of the synchronous link to the physical channels;

obtaining the data to be coded from the various data blocks on the dedicated channels and/or on the supplementary channels respectively allocated to the physical channels; and producing each modulated-signal block to be sent on a physical channel by coding and by modulating the corresponding data to be coded in accordance with the scheme indicated in relation to the said physical channel.

6. Method as claimed in claim 5, wherein the allocation of the supplementary channels of the synchronous link to the physical channels is determined by the sending station on the basis of indications transmitted by the data source in the supplementary channels.

7. A data source, comprising:

means for constructing data blocks of variable size with a view to sending of respective modulated-signal blocks on multiplexed physical channels by a remote sending station, the modulated-signal blocks being sent with a specified block rate on each physical channel;

means for transmitting the data blocks to the sending station over a synchronous link supporting dedicated channels respectively associated with the said physical channels, each offering a specified transmission capacity over a sending period inverse to the block rate, and supplementary channels;

means for dynamically allocating at least one supplementary channel of the synchronous link to each physical channel for which a data block of size greater than the said transmission capacity has been constructed; and means for segmenting the data blocks so as to divide each data block, constructed with a view to the sending of a modulated-signal block on a physical channel and having a size greater than the said transmission capacity, into a part transmitted on the dedicated channel associated with the said physical channel, and at least one other part transmitted on a supplementary channel of the synchronous link, respectively allocated dynamically to the said physical channel, wherein, on each supplementary channel of the synchronous link allocated to a physical channel for a sending period, an address identifying the said physical channel is transmitted.

8. Data source as claimed in claim 7, wherein each data block comprises data to be coded and control information including an indication of a coding scheme and/or modulation scheme to be applied to the said data to be coded by the sending station.

9. Data source as claimed in claim 7, wherein the supplementary channels of the synchronous link offer the same capacity as the dedicated channels, and wherein the means for transmitting the data blocks are arranged so as furthermore to transmit, on each of the synchronous link's supplementary channels allocated to a physical channel for a sending period, a serial number of the block part transmitted on the said supplementary channel within data block constructed with a view to the sending of the modulated-signal block on the said physical channel.

10. A sending station, comprising:

means for forming modulated-signal blocks from respective data blocks of variable size;

means for sending the modulated-signal blocks on multiplexed physical channels, with a specified block rate on each physical channel; and means for receiving the data blocks originating from a data source by a synchronous link supporting dedicated channels respectively associated with the said physical channels, each offering a specified transmission capacity over a sending period inverse to the block rate, and supplementary channels, wherein the means for receiving the data blocks comprise means for determining a dynamic allocation of supplementary channels of the synchronous link to at least one of the multiplexed physical channels during a sending period, and for assembling each data block having a size greater than the said transmission capacity, with a block part received on a dedicated channel associated with a physical channel and at least one other block part received on a respective supplementary channel of the synchronous link, which channel is allocated dynamically to the said physical channel, wherein, on each supplementary channel of the synchronous link allocated to a physical channel for a sending period, an address identifying the said physical channel is transmitted.

11. Sending station as claimed in claim 10, wherein each data block comprises data to be coded and control information including an indication of a coding scheme and/or modulation scheme, and wherein the means for forming modulated-signal blocks comprise a channel coder and a modulator which are controlled in accordance with the coding and/or modulation scheme indication received for each physical channel, so as to produce a modulated-signal block of fixed size.

12. Sending station as claimed in claim 10, wherein the means for determining the dynamic allocation of the supplementary channels of the synchronous link to the physical channels operate on the basis of indications transmitted by the data source in the supplementary channels.

* * * * *